(12) United States Patent
Benjamin et al.

(10) Patent No.: US 8,774,579 B2
(45) Date of Patent: Jul. 8, 2014

(54) ASYMMETRIC MULTI-CHANNEL GRIN OPTICAL CONNECTOR

(71) Applicants: Seldon David Benjamin, Painted Post, NY (US); Davide Domenico Fortusini, Ithaca, NY (US); Chi Zhang, Evanston, IL (US)

(72) Inventors: Seldon David Benjamin, Painted Post, NY (US); Davide Domenico Fortusini, Ithaca, NY (US); Chi Zhang, Evanston, IL (US)

(73) Assignee: Corning Cable Systems LLC, Hickory, NC (US)

( * ) Notice: Subject to any disclaimer, the term of this patent is extended or adjusted under 35 U.S.C. 154(b) by 43 days.

(21) Appl. No.: 13/624,427

(22) Filed: Sep. 21, 2012

(65) Prior Publication Data

US 2014/0086530 A1    Mar. 27, 2014

(51) Int. Cl.
*G02B 6/32* (2006.01)

(52) U.S. Cl.
USPC .......................................................... 385/33

(58) Field of Classification Search
CPC .......... G02B 6/24; G02B 6/32; G02B 6/2038; G02B 6/0288; G02B 6/40
USPC ............................................... 385/33, 34, 46
See application file for complete search history.

(56) References Cited

U.S. PATENT DOCUMENTS

| | | | |
|---|---|---|---|
| 4,213,677 A | 7/1980 | Sugimoto et al. ........... 350/96.18 |
| 4,521,071 A * | 6/1985 | Bohm .............................. 385/34 |
| 4,699,464 A * | 10/1987 | Cohen et al. .................. 385/123 |
| 5,172,271 A | 12/1992 | Sinclair ......................... 359/652 |
| 5,539,577 A | 7/1996 | Si et al. ......................... 359/629 |
| 5,612,824 A | 3/1997 | Si et al. ......................... 359/652 |
| 5,790,314 A | 8/1998 | Duck et al. .................... 359/654 |
| 5,832,153 A | 11/1998 | Duck .............................. 385/34 |
| 6,014,484 A | 1/2000 | Duck et al. ..................... 385/34 |
| 6,157,485 A | 12/2000 | Cheng ........................... 359/495 |
| 6,198,858 B1 | 3/2001 | Pan et al. ........................ 385/24 |
| 6,236,787 B1 * | 5/2001 | Laughlin ........................ 385/52 |
| 6,253,007 B1 * | 6/2001 | Laughlin ........................ 385/34 |
| 6,343,166 B1 * | 1/2002 | Hellman et al. ................ 385/31 |
| 6,393,179 B1 | 5/2002 | Cheng et al. ................... 385/34 |
| 6,567,586 B2 | 5/2003 | Brophy et al. ................. 385/33 |
| 7,346,236 B2 | 3/2008 | Asano et al. ................... 385/34 |
| 2004/0105626 A1 * | 6/2004 | Gallup et al. .................. 385/88 |
| 2012/0294576 A1 * | 11/2012 | Li ................................. 385/124 |
| 2012/0328255 A1 * | 12/2012 | Bickham ..................... 385/124 |

* cited by examiner

*Primary Examiner* — Charlie Peng (57) ABSTRACT

A gradient-index (GRIN) optical connector is disclosed that includes a GRIN lens having a central optical axis and front and back opposite endfaces. A plurality of optical fibers are optically coupled to the back endface of the GRIN lens and defines a first optical fiber bundle having an asymmetric arrangement relative to the central optical axis of the GRIN lens. The GRIN lens has a refractive index profile generally defined by an alpha profile having an alpha parameter $\alpha$ in a range $1.92 \leq \alpha \leq 1.98$. An optical fiber connector assembly formed by interfacing two of the GRIN optical connectors is also disclosed.

19 Claims, 10 Drawing Sheets

ASYMMETRIC MULTI-CHANNEL GRIN OPTICAL CONNECTOR

BACKGROUND

The present disclosure relates to optical connectors and in particular to optical connectors that utilize gradient-index (GRIN) lenses.

TECHNICAL BACKGROUND

Certain types of fiber optics-based telecommunication systems and data communication systems require the optical connection of multiple optical fibers that carry information on multiple channels from transmitters to receivers, or between transceivers. The optical connections are made using optical-fiber connectors ("optical connectors") configured to direct light from output optical fibers to corresponding input optical fibers so that the light can be efficiently relayed from a light source (transmitter) to a photodetector (receiver).

Optical connectors that utilize gradient-index (GRIN) lenses have been used in the past wherein a pair of confronting GRIN lenses is utilized to optically couple light between optical fibers. Multiple input and multiple output fibers could be used for a given GRIN lens pair. However, in such a configuration, cross talk can arise when light from one fiber is reflected by the exposed endfaces of the GRIN lenses and back into another optical fiber. In particular, since the cross-talk light arises from reflection, the cross talk happens between optical fibers that are symmetrically arranged relative to the optical axis of the GRIN lens. The effect is that light traveling in one channel ends up in another channel. If the cross-talk light reaches a receiver in another channel, it adversely affects the communication for that channel. If the cross-talk light reaches a laser light source, it can make the laser light source unstable, which also adversely affects the communication for that channel.

Known methods for mitigating reflection-based cross talk in optical connectors include the use of anti-reflection coatings, index-matching materials and angled GRIN endfaces. Unfortunately, the use of anti-reflection coatings is relatively expensive and difficult to implement on the small GRIN endfaces. Additionally, the use of index-matching materials adds cost and complexity to the optical connectors without fundamentally addressing the source of the cross talk. The use of angled GRIN endfaces is problematic because the azimuths of the GRIN lenses must be tightly controlled in the sense that any rotational misalignment degrades optical performance.

SUMMARY

An aspect of the disclosure is a GRIN optical connector that includes a GRIN lens having a central optical axis and front and back opposite endfaces. A plurality of optical fibers optically are coupled to the back endface of the GRIN lens to define a first optical fiber bundle having an asymmetric arrangement relative to the central optical axis of the GRIN lens. The GRIN lens has a refractive index profile generally defined by an alpha profile having an alpha parameter $\alpha$ that in one example is in the range $1.92 \leq \alpha \leq 1.98$.

Another aspect of the disclosure is an optical fiber connector assembly. The assembly has first and second GRIN lenses, with each GRIN lens having front and back endfaces, an optical axis and a same refractive index profile. The first and second GRIN lenses are interfaced at their front endfaces so that their optical axes are substantially coaxial. The assembly also includes a first optical fiber bundle of a first plurality of optical fibers optically coupled to the back endface of the first GRIN lens and having a first asymmetric configuration relative to the substantially coaxial optical axes. The assembly further includes a second optical fiber bundle of a second plurality of optical fibers optically coupled to the back endface of the second GRIN lens and having a second asymmetric configuration relative to the substantially coaxial optical axes. The first and second asymmetric configurations are either the same or rotated by 180° and define a plurality of channel pairs of first and second optical fibers. The channel pairs of first and second optical fibers have a coupling loss that varies among the channel pairs by no more than 0.1 dB.

Another aspect of the disclosure is a method of performing an optical connection between first and second optical fiber bundles. The method includes interfacing respective front endfaces of first and second GRIN lenses, each having a back endface, a same refractive index profile based on an alpha profile having an alpha parameter $\alpha$ in the range $1.92 \leq \alpha \leq 1.98$, and optical axes that are made substantially coaxial by said interfacing. The method also includes optically coupling a plurality of first optical fibers to the back endface of the first GRIN lens in a first asymmetric arrangement relative to the coaxial optical axes, and optically coupling a plurality of second optical fibers to the back endface of the second GRIN lens in a second asymmetric arrangement relative to the coaxial optical axes. The first and second asymmetric arrangements are the same or are rotated relative to one another by 180° to define a plurality of channel pairs of first and second optical fibers. The method also includes transmitting light between first and second optical fibers within only the respective channel pairs and through the first and second GRIN lenses.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework for understanding the nature and character of the claims.

BRIEF DESCRIPTION OF THE DRAWINGS

The accompanying drawings are included to provide a further understanding, and are incorporated in and constitute a part of this specification. The drawings illustrate one or more embodiments, and together with the Detailed Description serve to explain the principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

The entire disclosure of any publication or patent document mentioned herein is incorporated by reference.

Cartesian coordinates are shown in some of the Figures for the sake of reference and are not intended to be limiting as to direction or orientation.

Figure 1:
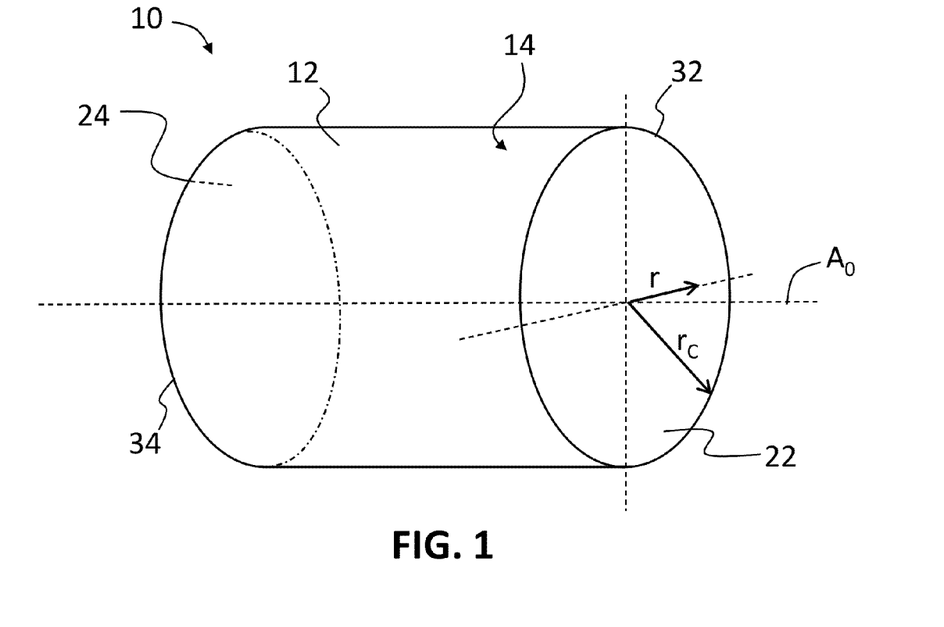
FIG. 1 is an isometric view of an example GRIN lens according to the disclosure.

FIG. 1 is an isometric view of an example GRIN lens 10 according to the disclosure. The GRIN lens 10 has a cylindrical body 12 that defines an optical axis $A_0$, an outer surface 14, and front and back endfaces 22 and 24. The front and back endfaces 22 and 24 have respective outer edges 32 and 34. The GRIN lens 10 has a refractive index profile n(r), where r is a radial coordinate. Example refractive index profiles n(r) for GRIN lens 10 are discussed in greater detail below.

Figure 2:
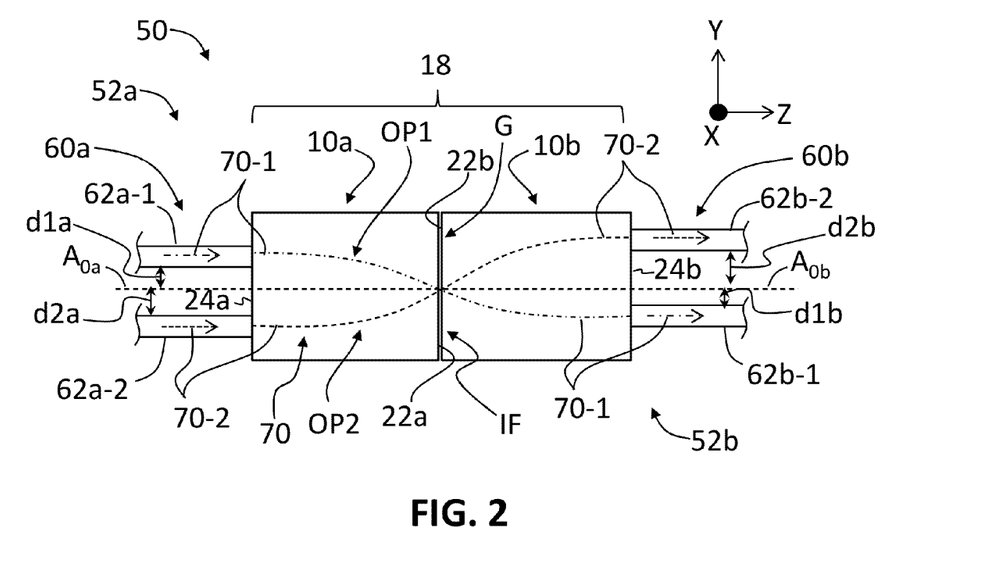
FIG. 2 is a side view of an example optical fiber assembly that employs first and second confronting GRIN lenses with first and second asymmetrically arranged optical fiber bundles.

FIG. 2 is a side view of an example optical connector assembly 50 that includes a pair of interfaced GRIN lenses 10a and 10b with respective optical axes $A_{Oa}$ and $A_{Ob}$ that are substantially coaxial. The GRIN lenses 10a and 10b are interfaced at their respective front endfaces 22a and 22b and define a GRIN lens system 18 having an interface IF. In an exemplary embodiment, endfaces 22a and 22b are in contact with each other. In another exemplary embodiment, endfaces 22a and 22b are separated by a gap G as illustrated in FIG. 2, and which may be for example in the range from 0 μm (i.e., no gap) to 100 μm in the axial direction. Having gap G that is greater than 0 μm may be desirable for reducing the risk of damage to endfaces 22a and 22b.

The GRIN lens 10a has optically coupled thereto at a back endface 24a a first set ("bundle") 60a of at least two optical fibers 62a (e.g., 62a-1 and 62a-2 as shown) that are arranged asymmetrically relative to GRIN lens axis $A_{Oa}$, as denoted by the different off-axis distances d1a and d2a of respective optical fibers 62a-1 and 62a-2 as measured radially from optical axis $A_{Oa}$. Likewise, GRIN lens 10b has optically coupled thereto at a back endface 24b a second set ("bundle") 60b of at least two optical fibers 62b (e.g., 62b-1 and 62b-2, as shown) that are arranged asymmetrically relative to GRIN lens axis $A_{Ob}$. The off-axis distances for optical fibers 62b-1 and 62b-2 are denoted d1b and d2b. In the example shown in FIG. 2, d1a=d1b and d2a=d2b.

The first GRIN lens 10a and first optical fiber bundle 60a define a first half 52a of optical connector assembly 50, while second GRIN lens 10b and second optical fiber bundle 60b define a second half 52b of the optical connector assembly. The optical connector assembly halves 52a and 52b are also each referred to herein as a GRIN optical connector 52. The GRIN optical connectors 52a and 52b are said to be complementary when their optical connection establishes optical communication between corresponding channel pairs of optical fibers (62a-1, 62b-1), (62a-2, 62b-2), etc.

GRIN lens system 18 serves to selectively direct light 70. In particular, light 70-1 is shown traveling in optical fiber 62a-1 and to optical fiber 62b-1 through GRIN lenses 10a and 10b over an optical path OP1, while light 70-2 is shown traveling in optical fiber 62a-2 and to optical fiber 62b-2 over an optical path OP2 through GRIN lenses 10a and 10b. The optical paths OP1 and OP2 are represented for ease of illustration by the chief rays of what is actually a bundle of rays. Note that optical paths OP1 and OP2 cross (substantially) coaxial optical axes $A_{Oa}$ and $A_{Ob}$ at interface IF. The off-axis locations of optical fibers 62 cause the optical paths OP1 and OP2 (as represented by respective chief rays) to intersect interface IF at an angle other than 90 degrees, with the chief rays having different incident angles at the interface. Example light 70 includes electromagnetic radiation having either a visible or near-infrared (IR) wavelength.

Corresponding pairs of optical fibers 62, e.g., pairs (62a-1, 62b-1) and (62a-2, 62b-2) define respective first and second communication channels and are thus referred to herein as "channel pairs."

Figure 3:
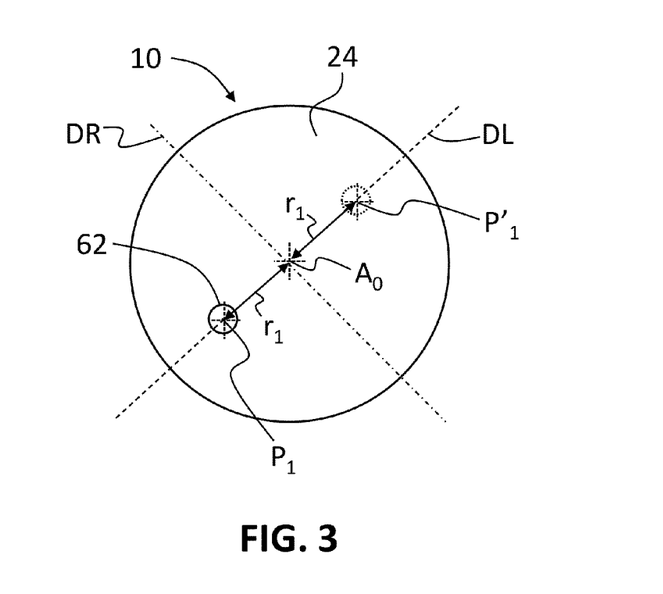
FIG. 3 is an endface view of the GRIN lens illustrating how a given optical fiber operably arranged at a given position $P_1$ at the GRIN lens endface precludes having an active optical fiber at its symmetric position $P'_1$.

The first and second optical fiber bundles 60a and 60b each have an asymmetric arrangement of their corresponding optical fibers 62a and 62b relative to the corresponding GRIN optical axes $A_{0a}$ and $A_{0b}$. FIG. 3 is an endface view of endface 24 of GRIN lens 10 and shows an example optical fiber 62 having a position P1 at the endface. A dashed line DL passes through optical axis $A_0$ and position $P_1$ while a dotted-dashed line DR is perpendicular to dashed line DL and passes through optical axis $A_0$.

The position $P_1$ is located at a radial distance $r_1$ from optical axis $A_0$. The endface location symmetric to position $P_1$ is denoted $P'_1$ and is located distance $r_1$ from optical axis $A_0$ along dashed line DL but on the opposite side of the optical axis. In other words, the symmetric location of a given position $P_1$ is a reflection over line DR. In GRIN optical connectors 52 disclosed herein, for a given optical fiber 62 at a position P1, there is either no other optical fiber 62 at the symmetric position $P'_1$, or if there is an optical fiber at the symmetric position, it is inactive. The asymmetry of optical fiber bundle 60 serves to reduce or eliminate cross talk that arises from internally reflected light 70 from front endface 22, from light reflected from the confronting front endface of the adjacent GRIN lens, or more generally from interface IF.

The arrangement of first and second optical fiber bundles 60a and 60b correspond to each other, i.e., they have either the same arrangement when viewed end on, or have a complementary arrangement defined by a 180° rotation. Thus, once the particular arrangement of optical fibers 62 for one of first and second optical fiber bundles 60a and 60b is known, the arrangement for the other optical fiber bundle is determined based on the configuration of GRIN optical system 18. Example asymmetrical arrangements of first and second optical fiber bundles 60a and 60b are described below.

Referring again to FIG. 1, the refractive index profile of GRIN lens 10 can be defined by the following equation, which defines what is sometimes called an "alpha profile":

$$n(r) = \frac{n_2}{1-\Delta_0} \cdot \left[1 - \Delta_0 \cdot \left(\frac{r}{r_C}\right)^\alpha\right], r \leq r_C \quad (1)$$

where the index parameter $$\Delta_0 = \frac{n_1 - n_2}{n_1},$$

r is a radial coordinate, $n_1$ is the refractive index on optical axis $A_0$, $n_2$ is the refractive index at outer surface 14, $r_C$ is the radius of body 12 as measured out from optical axis $A_0$ to outer surface 14, and α is called the "alpha parameter."

Because the alpha parameter α is an exponent, it has a strong effect on the shape of the refractive index profile. The value of a for a conventional GRIN lens is α=2, which defines a parabolic refractive index profile. However, the value of α in GRIN lens 10 disclosed herein is "detuned" from the conventional value of α=2 to better accommodate the asymmetric arrangement of optical fiber bundle 60. In particular, as illustrated in FIG. 2, the refractive index profile gives rise to a reduced difference of coupling efficiency CE between channel pairs of optical fibers 62 as compared to the conventional refractive index profile. In an example embodiment, a value α=1.95 achieves this purpose. In an example embodiment, the alpha parameter is in the range $1.92 \leq \alpha \leq 1.98$, while in another example, the alpha parameter is in the range $1.92 \leq \alpha \leq 1.95$. This feature of GRIN lens 10 is discussed in greater detail below.

The refractive indices $n_1$ and $n_2$ define the numerical aperture $NA_{10}$ of GRIN lens 10 via the (approximate) relationship $NA_{10}=[n_1^2-n_2^2]^{1/2}$. In view of the off-axis configuration of optical fibers 62, the index parameter $\Delta_0$, which is based on $n_1$ and $n_2$, is in an example selected so that $NA_{10}$ is larger than the $NA_F$ of the optical fibers, i.e., $NA_{10} > NA_F$.

In another example, $NA_R > NA_F$, where $NA_R = [n^2(R) - n_2^2]^{1/2}$, wherein R is the radial distance between optical fiber 62 and optical axis $A_0$ of GRIN lens 10. It is noted here that in the case where optical fiber bundle 60 has optical fibers 62 with different values for $NA_F$ (i.e., some optical fibers 62 have a low $NA_F$, some have a higher $NA_F$), it is advantageous to place the fiber with the higher $NA_F$ closer to optical axis $A_0$.

In an example embodiment, the index parameter $\Delta_0$ has a maximum value of about 2.5%, though higher values can be employed. The value of $\Delta_0$ for the GRIN lenses 10 generally depends on the value of the Numerical Aperture (NA) of the optical fibers 62 used, which in turn generally depends on the value of $\Delta_0$ of the optical fibers 62. For an optical fiber 62 having a $\Delta_0$ of about 1.8% to 1.9%, then a suitable value of $\Delta_0$ for GRIN lens 10 is in the range $1.85\% \leq \Delta_0 \leq 3.0\%$, with an exemplary value being about 2.5%. For an optical fiber 62 having a $\Delta_0$ of about 1%, then a suitable value of $\Delta_0$ for GRIN lens 10 is in the range $1.0\% \leq \varepsilon_0 \leq 3.0\%$. The maximum value of index parameter $\Delta_0$ is limited only by the ability to form a steep refractive index gradient in body 12 between the on-axis position r=0 and the outer radius $r=r_C$. The value of $\Delta_0 = 2.5\%$ represents an exemplary balance between performance and cost.

Figure 4A:
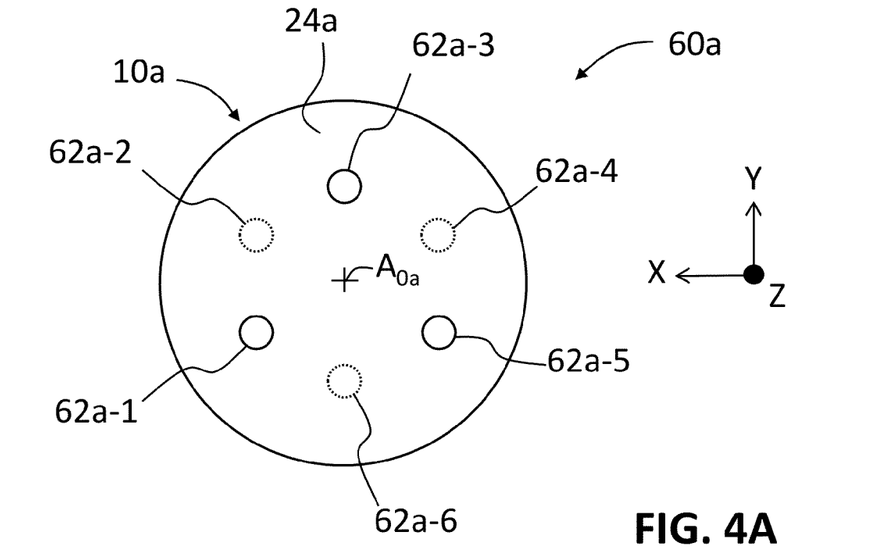
FIGS. 4A and 4B are endface views of the endfaces of the first and second GRIN lenses of an example optical connector assembly, along with the corresponding example asymmetric arrangement of first and second optical fiber bundles based on a hexagonal configuration of possible optical-fiber positions.
Figure 4B:
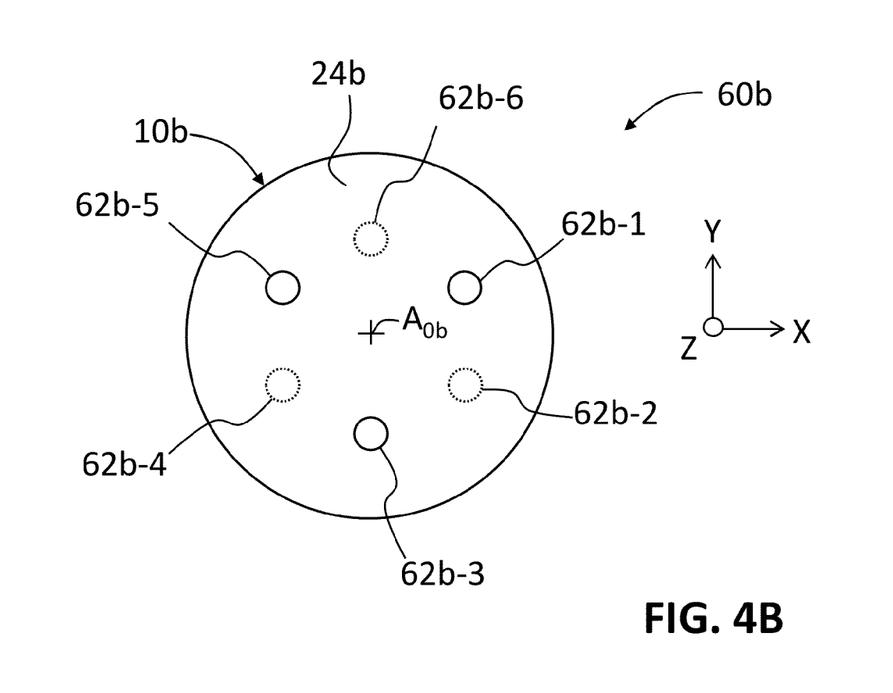

FIGS. 4A and 4B are end-on views of endfaces 24a and 24b of GRIN lenses 10a and 10b, along with the corresponding asymmetric arrangement of first and second bundles 60a and 60b of optical fibers 62a and 62b as part of an example optical connector assembly 50 such as the one shown in FIG. 2. The first and second bundles 60a and 60b of optical fibers 62a and 62b are configured based on a hexagonal arrangement of possible optical fiber positions about optical axes $A_{0a}$ and $A_{0b}$. In one example embodiment, first optical fiber bundle 60a consists of six optical fibers 62a-1 through 62a-6, and second optical fiber bundle 60b consists of six optical fibers 62b-1 through 62b-6.

However, in optical fiber bundles 60a and 60b, select channel pairs of optical fibers—for example, (62a-2, 62b-2), (62a-4, 62b-4) and (62a-6, 62b-6)—are inactive (as indicated by the dashed-line circles), which breaks the symmetry of the arrangement. Because these channel pairs are made up of inactive optical fibers 62a and 62b, the possibility of cross talk for the corresponding one or more channels due to endface or interface reflection is precluded. Here, the word "inactive" means that the optical fiber is physically present but not being used to transmit or detect an optical signal.

In another example embodiment, the select channel pairs of optical fibers 62a and 62b are not included in (i.e., are not physically present in) first and second optical fiber bundles 60a and 60b (as indicated by the dashed-line circles) so that their positions in the arrangement remain unoccupied, i.e., the optical fibers are absent from their respective bundles.

An example optical fiber 62 is a graded-index multimode fiber. An example of such a multimode optical fiber has a nominal core diameter of 80 μm and nominal numerical aperture $NA_F=0.29$. However, GRIN optical connector 52 disclosed herein can be implemented with multimode fibers having different configurations, as well as with single-mode optical fibers, albeit with the potential for higher loss (i.e., less coupling efficiency) than would be the case with multimode optical fibers.

Figure 5:
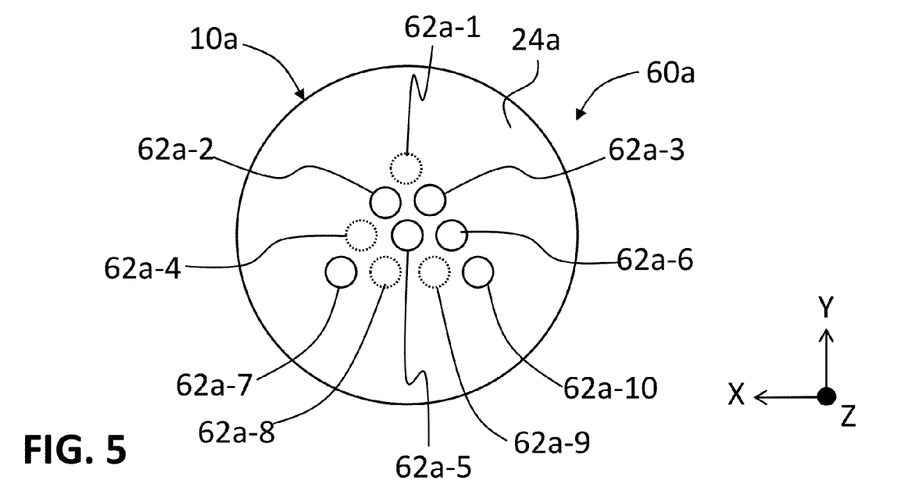
FIG. 5 is an end-on view of a GRIN lens endface similar to FIG. 4A and illustrates an example arrangement of the first optical fiber bundle based on a triangular configuration of ten possible optical-fiber positions.

Any number of asymmetric arrangements for optical fiber bundle 60 can be used. FIG. 5 is an end-on view similar to FIG. 4A and illustrates an example arrangement of first optical fiber bundle 60a of optical fibers 62a based on a triangular configuration of ten possible optical fiber positions. The arrangement includes inactive or absent optical fibers 62a-1, 62a-4, 62a-8 and 62a-9, by way of example. The corresponding configuration for the second set of optical fibers 62b is either the same or is found by reflection about an axis, depending on the configuration of GRIN optical system 18.

Figure 6:
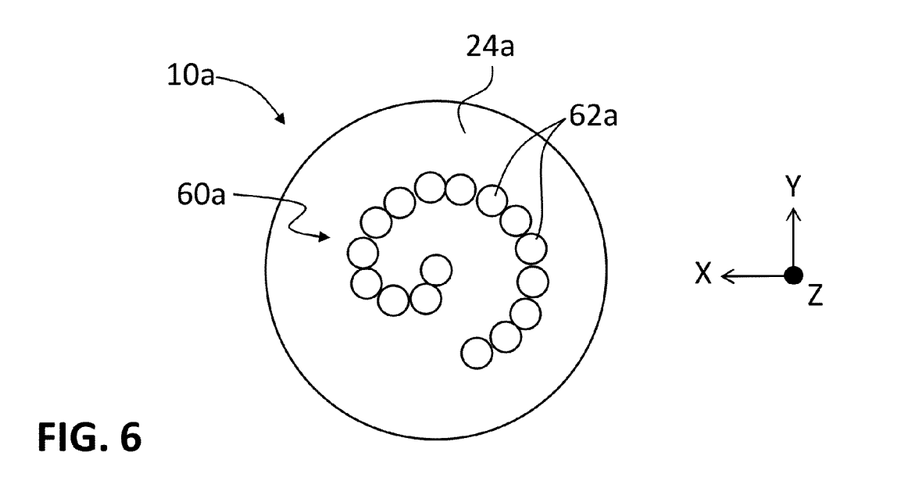
FIG. 6 is another endface view of a GRIN lens similar to FIG. 4A and illustrates an example arrangement of the first optical fiber bundle based on a spiral configuration for sixteen optical fibers.

FIG. 6 is another endface view of GRIN lens 10a similar to FIG. 5 and illustrates an example arrangement of first optical fiber bundle 60a based on a spiral configuration of sixteen optical fibers 62a. In this particular configuration, there is no need for any of optical fibers 62a to be inactive since none of the optical fibers occupy a position that is symmetrical with that of another optical fiber.

In example embodiments of optical connector assembly 50, GRIN lenses 10a and 10b have the same axial length, each being approximately equal to one-quarter pitch, i.e. $L_a = L_b = (\frac{1}{4})P$ so that GRIN optical system 18 has a length of one half pitch (i.e. $(\frac{1}{2})P$). For such a length, divergent light 70 at one endface (say, back endface 24) becomes substantially collimated light at the opposite endface (here, front endface 22). As described herein one "quarter-pitch" (i.e., $(\frac{1}{4})P$) length of a gradient index lens is the length of gradient index medium in which a substantially collimated bundle of rays is substantially focused to a point by the guiding action of the refractive index gradient. In an example, the values of the length are nominal, i.e., substantially equal to $(\frac{1}{4})P$, $(\frac{1}{2})P$, etc.

Figure 7:
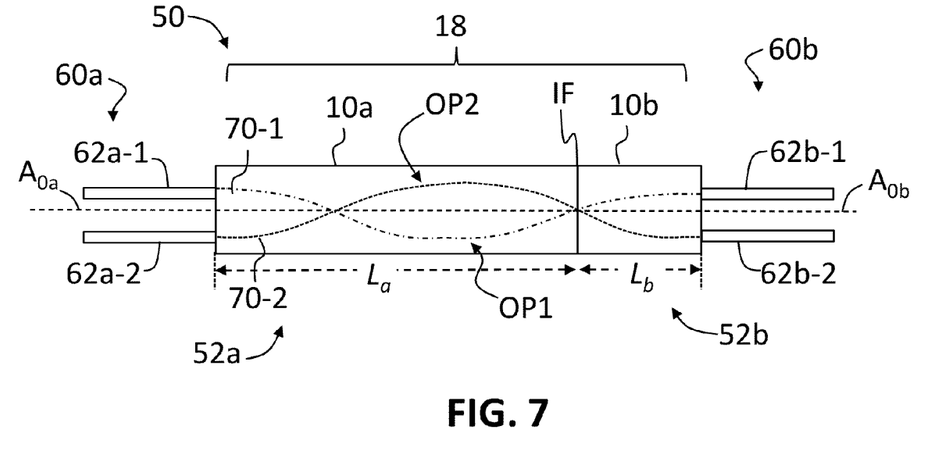
FIG. 7 is similar to FIG. 2 and illustrates an example where the GRIN optical system has a length equal to one pitch (L=P) based on a length $L_a=(3/4)P$ for the first GRIN lens and a length $L_b=(1/4)P$ for the second GRIN lens.

However, the overall length of GRIN optical system 18 need not be $(\frac{1}{2})P$ and can have another length that allows for the channel pairs of fibers 62a and 62b to be in optical communication (i.e., maintains polarity between the channel pairs of optical fibers). FIG. 7 is similar to FIG. 2 and illustrates an example where GRIN optical system 18 has a length equal to one pitch (P) based on a length $L_a = (\frac{3}{4})P$ and a length $L_b = (\frac{1}{4})P$. The first and second optical fiber bundles 60a and 60b are asymmetrical relative to coaxial axes $A_{Oa}$ and $A_{Ob}$ but their arrangements are not rotated by 180° relative to each other. This is because light 70-1 associated with a first channel pair of optical fibers (62a-1, 62b-1) starts out in optical fiber 62a-1 near the "top" of GRIN lens 10a and ends up entering its counterpart optical fiber 62b-1 near the "top" of GRIN lens 10b. The analogous situation holds for light 70-2 associated with the second channel pair of optical fibers (62a-2, 62b-2) starting out at the "bottom" of GRIN lens 10a and finishing at the "bottom" of GRIN lens 10b. It is also noted that light (beams) 70-1 and 70-2 have optical paths OP1 and OP2 such that these light beams are substantially expanded and collimated at interface IF between GRIN lenses 10a and 10b. A GRIN optical system equivalent to the one of FIG. 7 can also be obtained with $L_a = (\frac{1}{4})P$ and $L_b = (\frac{3}{4})P$.

Figure 8:
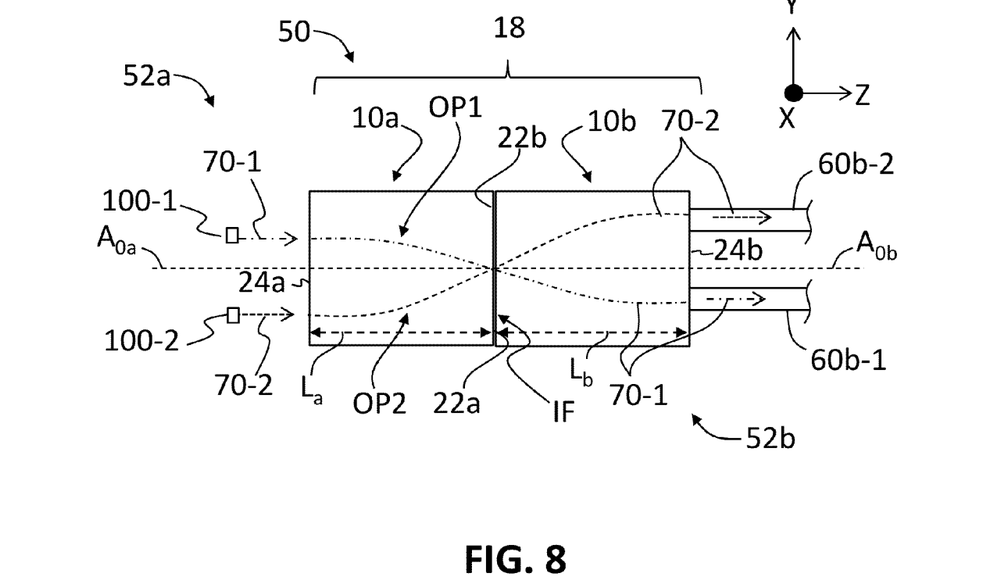
FIG. 8 illustrates an embodiment of an optical connector assembly similar to that shown in FIG. 2, except that the asymmetrically arranged optical fibers for the first GRIN lens have been replaced with asymmetrically arranged light sources.

FIG. 8 illustrates an embodiment of optical connector assembly 50 similar to that shown in FIG. 2, except that asymmetrically arranged optical fibers 62a-1 and 62a-2 have been replaced with first and second asymmetrically arranged light sources 100-1 and 100-2. In an example embodiment, first and second light sources 100-1 and 100-2 are vertical-cavity surface-emitting lasers (VCSELs). The light sources 100-1 and 100-2 respectively emit light 70-1 and 70-2. When light sources 100 are spaced apart from endface 24a of GRIN lens 10a, the length $L_a$ of the GRIN lens needs to made smaller (i.e., needs to have a smaller length than one-quarter pitch) to account for the divergence of light beams 70 prior to reaching the endface of the GRIN lens in order for the light beams to be substantially collimated at interface IF.

In an example embodiment, GRIN lenses 10a and 10b have only a small amount of chromatic aberration when used at the three main telecommunications wavelengths of 850 nm, 1,310 nm and 1550 nm. This allows for GRIN lens system 18 to be used in an optical connector assembly 50 for applications that involve the use of either light sources 100 having these different wavelengths or optical fibers 62 that carry these different wavelengths. More generally, GRIN optical system 18 can be used with different wavelengths whose difference is such that the amount of chromatic aberration of the GRIN optical system is acceptable from the viewpoint of coupling efficiency CE.

For a GRIN lens having a refractive index defined by equation (1) with $\alpha \approx 2$ the pitch can be calculated using the following equation:

$$P \approx \frac{2\pi r_c}{\sqrt{2\Delta_0}}$$

the value of $\Delta_0$ depends on the wavelength through the material dispersion, and can be calculated from the Sellmeier coefficients of the specific material.

Table 1 below summarizes the quarter-pitch length $(\frac{1}{4})P$ associated with the aforementioned telecommunications wavelengths $\lambda$ for an example GRIN lens 10 made of Germania-doped silica glass. The change in the quarter-pitch length is very small, i.e., on the order of a few microns or tens of microns. Consequently, for certain applications, the same GRIN lens 10 could be used at the different wavelengths with acceptable performance This is more likely to be the case in applications where the GRIN lens is used with multimode fibers.

TABLE 1

| GRIN lens ¼-pitch length $(\frac{1}{4})P$ in µm, for $\Delta = 1.88\%$, $\alpha \approx 2$ | | |
|---|---|---|
| $\lambda$ (nm) | $(\frac{1}{4})P$ for $r_C = 300$ µm | $(\frac{1}{4})P$ for $r_C = 500$ µm |
| 850 | 2,418 µm | 4,030 µm |
| 1,300 | 2,435 µm | 4,059 µm |
| 1,550 | 2,436 µm | 4,060 µm |

It is desirable that the coupling loss of optical connector assembly 50 be substantially uniform, i.e., that all channels have substantially the same amount of coupling loss, regardless of the location of optical fiber 62 at GRIN endface 24. The conventional refractive index profiles for conventional GRIN lenses have increasingly higher coupling loss (i.e., a smaller coupling efficiency CE) as the axial offset distance increases. This coupling loss characteristic is due mainly to aberrations introduced by the GRIN lens.

Commonly used formulas to express the refractive index profile of known GRIN lenses are.

$$n(r) = n_1 \text{sech}(ar) \qquad (2)$$

$$n(r) = n_1 [1 + (Ar)^2]^{-\frac{1}{2}} \qquad (3)$$

-continued $$n(r) = n_1\left[1 - \frac{A}{2}r^2\right] \quad (4)$$

It is known that equations (2) & (3) represent refractive index profiles that minimize aberrations in the imaging of meridional rays and of skew rays, respectively. Equation (4) is alternative equation that can be used to describe the refractive index profile of GRIN lenses. It is noted that equation (1) with α=2 is identical to equation (4). The modified refractive index profile for GRIN lens 10 disclosed herein is based on equation (1), wherein the modification is based on changing (detuning) the value of the alpha parameter α.

In an example embodiment, optical connector assembly 50 is configured such that the loss for the different channels varies by no more than 0.1 dB regardless of the off-axis distance of optical fibers 62. This is accomplished by utilizing GRIN lenses 10a and 10b, which each have refractive index profiles that differ from the typical ideal refractive index profile for a GRIN lens. In particular, an example refractive index profile for each of GRIN lenses 10a and 10b is the "alpha profile" according to equation (1) above, wherein α is detuned from its usual optimum value of 2. In an example, the de-tuned alpha parameter is in the aforementioned range $1.92 \leq \alpha \leq 1.98$.

A configuration for GRIN lenses 10a and 10b having the aforementioned de-tuned alpha parameter produces a more uniform coupling loss, i.e., a loss that is substantially the same (e.g., a variation between channel pairs of no more than 0.1 dB) for all channel pairs of optical fibers 62 regardless of their off-axis distance.

Figure 9A:
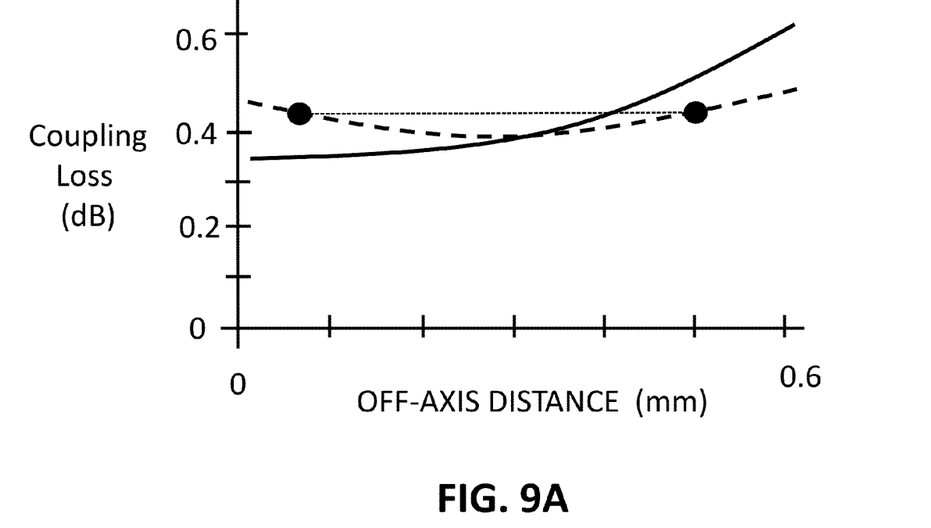
FIG. 9A is a schematic plot of the coupling loss (dB) versus off-axis distance (mm) for a conventional GRIN lens (solid line) and GRIN lens according to the disclosure (dashed line), illustrating how the coupling loss as a function of off-axis distance is more uniform for the GRIN lens according to the disclosure.

FIG. 9A is a schematic plot of the coupling loss (dB) versus off-axis distance (mm) for a conventional GRIN lens (solid line) and GRIN lens 10 according to the disclosure (dashed line). The conventional GRIN lens shows a steady increase in coupling loss with off-axis distance. On the other hand, GRIN lens 10 having a de-tuned alpha parameter includes off-axis locations where the coupling loss is the same, such as the two off-axis positions indicated by the solid circles connected by the horizontal dotted line. Generally, the coupling loss curve associated with the de-tuned alpha parameter is more flat as a function of off-axis distance so that the coupling loss varies less as a function of off-axis distance as compared to a conventional GRIN lens.

Figure 9B:
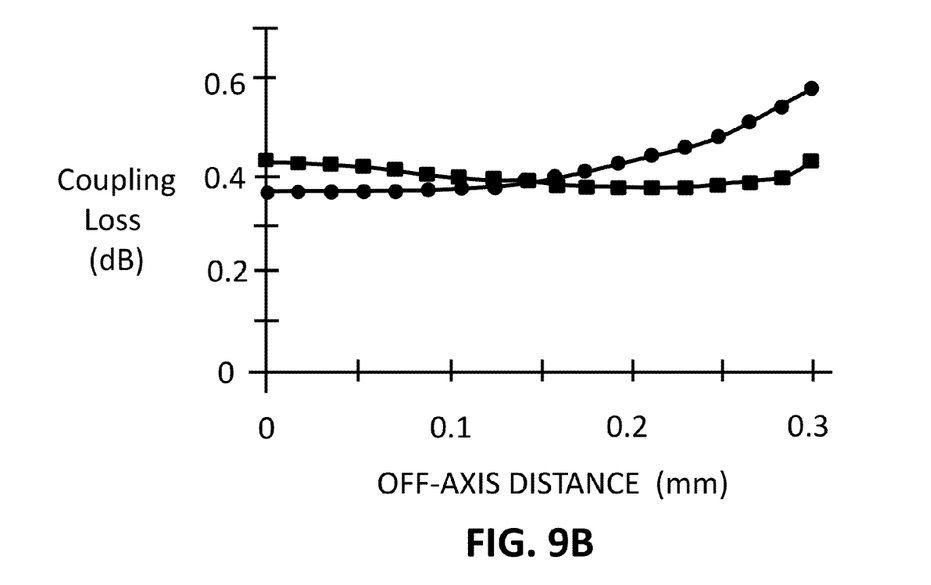
FIG. 9B is similar to FIG. 9A and is based on calculations for a GRIN lens with a conventional refractive index profile (circles) and for a GRIN lens with a modified refractive index profile based on Equation (1) (squares)

FIG. 9B is similar to FIG. 9A and is based on calculations for two different refractive index profiles for a GRIN lens. The first example GRIN lens has a conventional configuration and is represented by the curve with circles. The conventional GRIN lens is defined by an index parameter $\Delta_0$=2.5%, α=2 and radius $r_C$=500 μm. The second example is for GRIN lens 10 as disclosed herein and is represented by the curve with squares. The example GRIN lens 10 is defined by an index parameter $\Delta_0$=2.5%, α=1.95 and radius $r_C$=500 μm. As can be seen from FIG. 9B, the curve with squares is flatter and similar to the desired dashed-line curve of FIG. 9A, and has a slight parabolic shape so that the variation of coupling loss with off-axis distance is less than that for the GRIN lens having a conventional refractive index profile.

Figure 10:
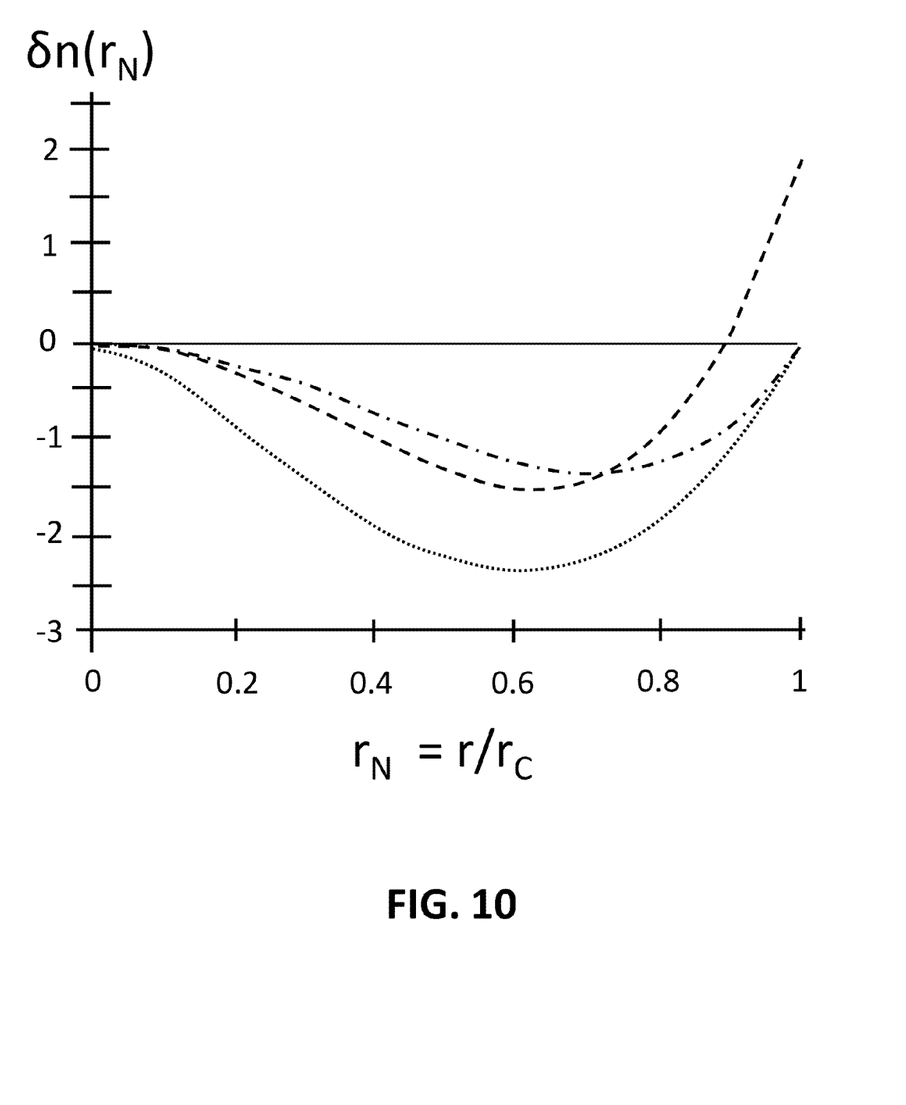
FIG. 10 is a plot of the refractive index profile difference $\delta n(r_N)$ vs. normalized radius $r_N$ for different refractive index profiles n(r), including the modified refractive index profile based on a de-tuned value of the alpha parameter as used in the GRIN lens according to the disclosure.

FIG. 10 plots the difference in refractive index profile $\delta(r_N)$ vs. normalized radius $r_N = r/r_C$ for example GRIN lens refractive index profiles, wherein $$\delta n(r) = (1/n_1) \cdot [n(r) - n^*(r)] \cdot 10^4. \quad (5)$$

In this expression, n*(r) denotes the refractive index described by equation (4), and n(r) denotes the refractive index described by equation (1) [with α=1.95], equation (2) or equation (3), as indicated by the dotted line, by the dotted-dashed line, and by the dashed line, respectively. The various curves in FIG. 10 indicate the differences between the refractive index profile n(r) for GRIN lens 10 disclosed herein versus that for conventional GRIN lenses. An aspect of the disclosure includes providing GRIN lens 10 with a refractive index profile n(r) that includes off-axis positions with substantially the same coupling loss. This aspect includes then forming GRIN lens system 18 with optical fibers 62a and 62b at asymmetric off-axis positions so that different channel pairs of optical fibers have substantially the same channel loss.

Figure 11:
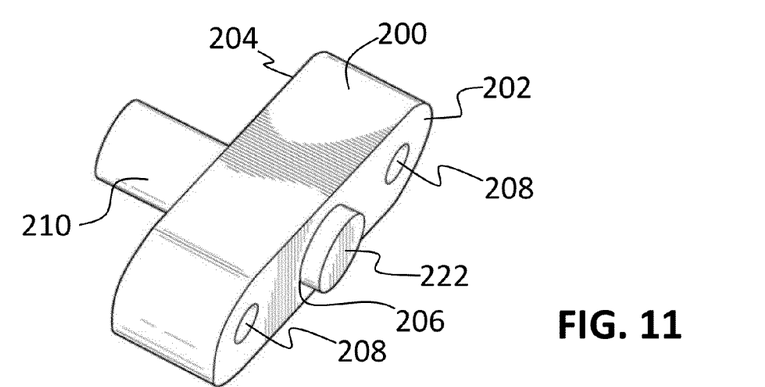
FIGS. 11 through 13 are elevated front-end views (FIGS. 11 and 12) and a back-end view (FIG. 13) of an example GRIN lens holder used for holding a GRIN lens that is cut and polished from a GRIN rod.

FIGS. 11 through 17 illustrate example steps for forming a GRIN optical connector 52 using GRIN optical system 18 and optical fibers 62 as described above. FIG. 11 is an elevated view of a GRIN lens holder 200 having front and back ends 202 and 204 and a central hole 206 sized to accommodate a GRIN rod 210 having an end 222. The GRIN lens holder 200 also includes peripheral axially extending registration holes 208 that lie along a line with central hole 206 and that are open at front and back ends 202 and 204 of the GRIN lens holder. The GRIN rod 210 is inserted into central hole 206 so that its end 222 protrudes from front end 202 of GRIN lens holder 200.

Figure 12:
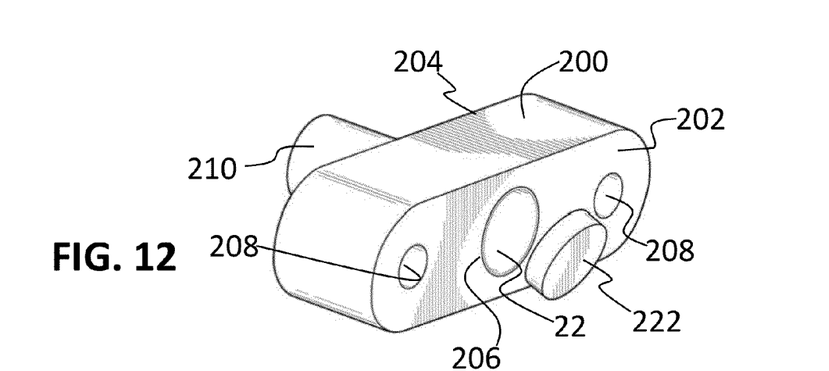
Figure 13:
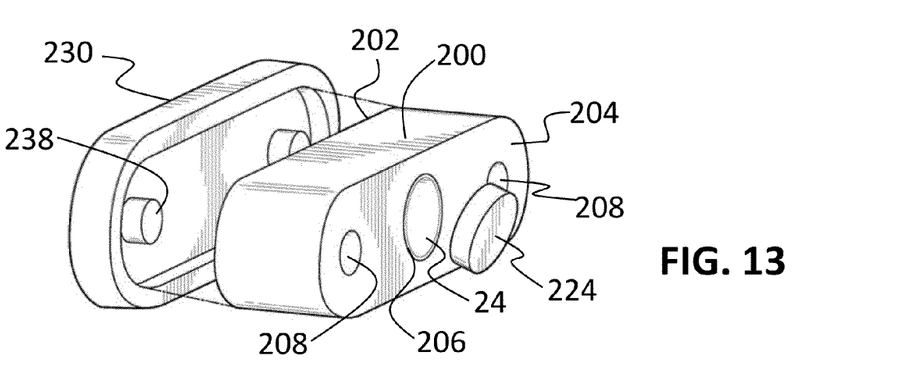

With reference now to FIGS. 12 and 13, GRIN rod 210 is cut near its end 222 and then polished to create a new end, namely, front endface 22, that is flush with front end 202 of GRIN lens holder 200. Likewise, the portion of GRIN rod 210 extending from back end 204 of GRIN lens holder 200 is cut (see FIG. 13) and then polished so that it is flush with the back end and forms a new end, namely, back endface 24. The cut portion of GRIN rod 210 held within central hole 206 forms GRIN lens 10 having the aforementioned front and back endfaces 22 and 24. With reference to FIG. 13, a protective cover 230 with alignment features 238 that align with registration holes 208 is placed over front end 202 of GRIN lens holder 200 to protect GRIN lens front endface 22. Another protective cover 230 (not shown) can also be placed over back end 204 of GRIN lens holder 200 to protect the polished GRIN lens back endface 24.

Figure 14:
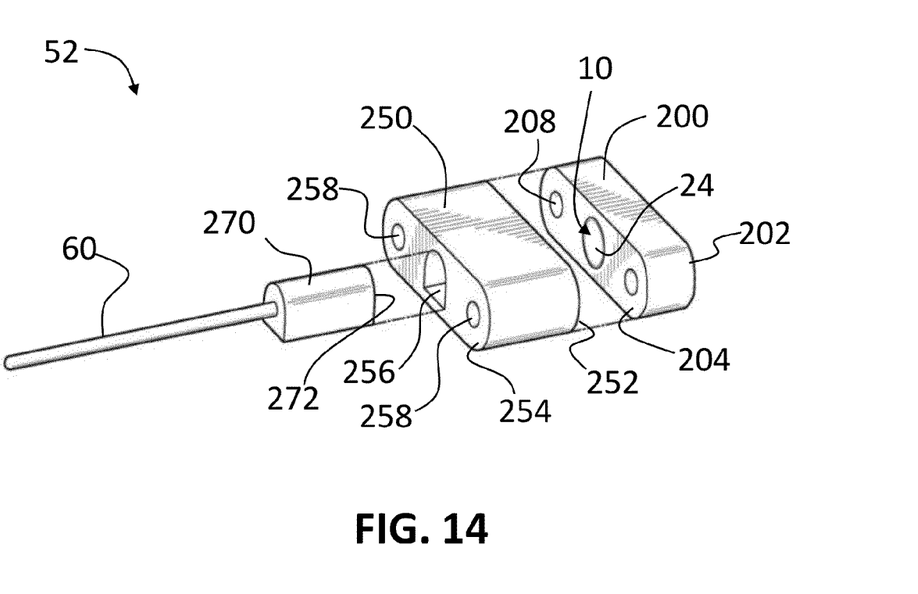
FIG. 14 is an elevated view of the GRIN lens holder and GRIN lens therein, along with an optical fiber bundle and optical fiber holder.

FIG. 14 is a partially exploded elevated view of GRIN optical connector 52 in the process of being fabricated and shows GRIN lens holder 200 along with an optical fiber holder 250 and optical fiber bundle 60. The optical fiber holder 250 has a front end 252, a back end 254, a central hole 256 and peripheral guide holes 258 that are generally on the same line as the central hole. The optical fiber holder 250 has substantially the same cross-sectional shape as GRIN lens holder 200, and central hole 256 and guide holes 258 of the optical fiber holder are respectively aligned with central hole 206 and guide holes 208 of GRIN lens holder 200.

The optical fiber bundle 60 is terminated by an insertion feature 270 having a front end 272. The central hole 256 of optical fiber holder 250 is sized to receive insertion feature 270. In an example embodiment, insertion feature 270 has a select shape, and central hole 256 has the complimentary shape so that the insertion feature fits into the central hole in only one orientation. This type of configuration serves a keying function that ensures that the asymmetric configuration of optical fibers 62 in optical fiber bundle 60 will have the proper placement at back endface 24 of GRIN lens 10.

The insertion feature 270 is thus inserted into central hole 256 of optical fiber holder 250 so that front end 272 of the insertion feature substantially flush with front end 252 of the optical fiber holder. The ends of optical fibers 62a are then polished along with front end 272 of optical fiber holder 250 so that the optical fiber ends and the optical fiber holder front end are flush.

Figure 15:
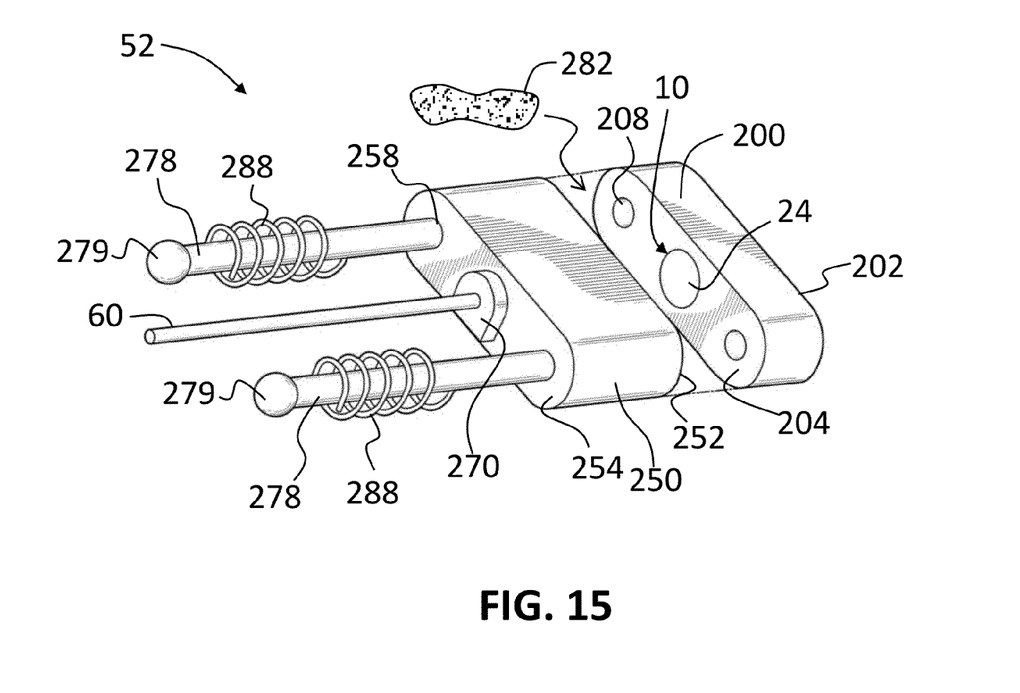
FIG. 15 is an elevated view similar to FIG. 14 and shows the optical fiber bundle held by the optical fiber holder and also shows registration pins used to register the GRIN lens holder and the optical fiber holder when the two holders are interfaced.

FIG. 15 is a partially exploded view of GRIN optical connector 52 similar to FIG. 14 and shows insertion feature 270 of first optical fiber bundle 60a operably engaged by optical fiber holder 250. Registration pins 278 are inserted through guide holes 258 of optical fiber holder 250 and guide holes 208 of GRIN lens holder 200. In an example, registration pins 278 have bulbous ends 279.

In an example, an adhesive material 282 is introduced between front end 252 of optical fiber holder 250 and back end 204 of GRIN holder 200 to secure these holders together when they are interfaced. In an example, adhesive 282 is substantially index-matched to GRIN lens 10 and optical fibers 62a to reduce reflections. Once adhesive 282 is applied, optical fiber holder 250 and GRIN lens holder 200 are urged together, with registration pins 278 serving to maintain alignment of optical fiber bundle 60 and GRIN lens 10. In an example, each registration pin 278 is provided with a resilient member 288 such as a spring as shown, and whose function is described below.

Figure 16:
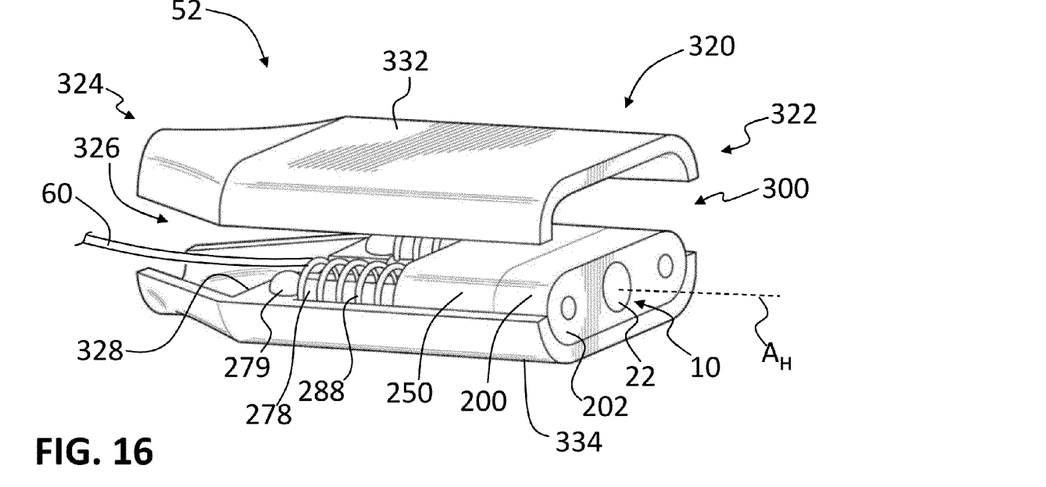
FIGS. 16 and 17 are elevated views of the optical connector that illustrate an example embodiment wherein the optical connector includes a housing.

FIG. 16 is a partially exploded view of GRIN optical connector 52 of FIG. 15 residing within a housing 320. The housing 320 has front and back ends 322 and 324, and in an example is formed from a top section 332 and a bottom section 334. The housing 320 has a longitudinal central axis $A_H$ and defines an interior 326 sized to hold the main component of optical connector assembly 52 as shown in FIG. 15. The interior 326 includes a wall 328 that engages bulbous ends 279 of registration pins 278 and that serves as an end stop for resilient members 288. This serves to allow optical fiber holder 250 and GRIN lens holder 200 (which are now fixed to one another) to axially slide along registration pins 278. This allows for optical fiber holder 250 and GRIN lens holder 200 to be pushed into housing interior 326 to a recessed position, with resilient members 288 urging the holders back into a forward position at housing front end 322 when the pushing force is removed.

Figure 17:
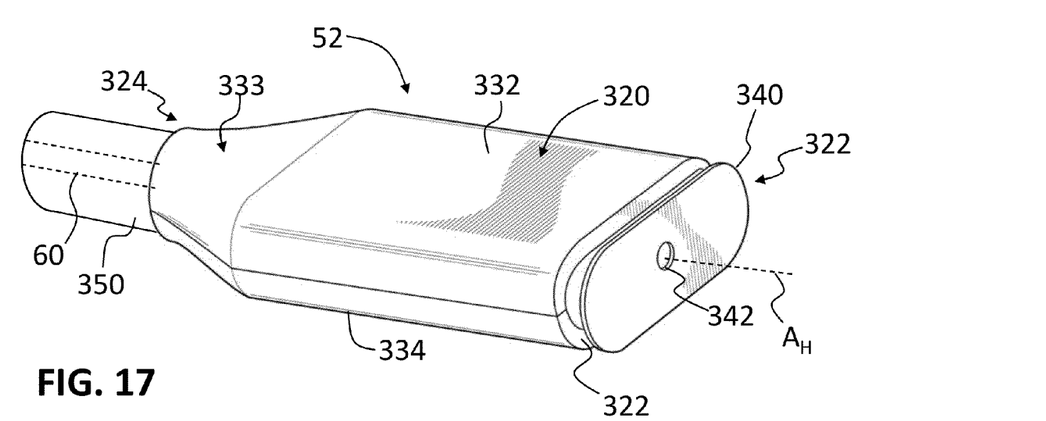

FIG. 17 is similar to FIG. 16 and shows housing 320 in place and optical fiber bundle 60 incorporated into a fiber optic cable 350 that interfaces with the housing at a tapered portion 333 adjacent housing back end 324. An optional end cap 340 having a central aperture 342 is arranged at housing front end 322 to cover front end 202 of GRIN lens holder 200. The central aperture 342 is aligned with GRIN lens 10 held within GRIN lens holder 200 (not shown in FIG. 17; see FIG. 14).

Figure 18:
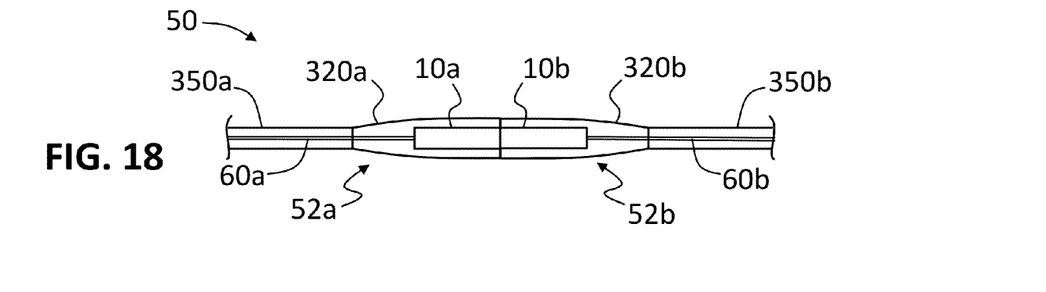
FIG. 18 is a cross-sectional view of an example optical connector assembly that includes two operably coupled (interfaced) GRIN optical connectors similar to those shown in FIG. 17.

FIG. 18 is a cross-sectional view of an example optical connector assembly 50 that includes two operably coupled (interfaced) GRIN optical connectors 52a and 52b similar to the GRIN optical connector shown in FIG. 17, with respective fiber optic cables 350a and 350b, and respective housings 320a and 320b.

It will be apparent to those skilled in the art that various modifications to the preferred embodiments of the disclosure as described herein can be made without departing from the spirit or scope of the disclosure as defined in the appended claims. Thus, the disclosure covers the modifications and variations, provided they come within the scope of the appended claims and the equivalents thereto.

What is claimed is:

1. A gradient-index (GRIN) optical connector, comprising:
a GRIN lens having a central optical axis and front and back opposite endfaces;
a plurality of optical fibers optically coupled to the back endface of the GRIN lens and that defines a first optical fiber bundle having an asymmetric arrangement relative to the central optical axis of the GRIN lens; and
wherein the GRIN lens has a refractive index profile generally defined by an alpha profile having an alpha parameter α in a range 1.92≤α≤1.98, where the alpha parameter α is defined by $$n(r) = \frac{n_2}{1-\Delta_0} \cdot \left[1 - \Delta_0 \cdot \left(\frac{r}{r_C}\right)^\alpha\right], r \leq r_C.$$

2. The GRIN optical connector according to claim 1, further having a coupling loss associated with the plurality of optical fibers that varies between the optical fibers by less than 0.1 dB when the GRIN optical connector is optically connected to a complementary GRIN optical connector.

3. The GRIN optical connector according to claim 1, wherein the plurality of optical fibers consists of multimode optical fibers.

4. The GRIN optical connector according to claim 1, wherein the GRIN lens has a refractive index parameter $\Delta_0$ in the range 1.0≤$\Delta_0$≤3.0, where the refractive index parameter $\Delta_0$ is defined by $$\Delta_0 = \frac{n_1 - n_2}{n_1}.$$

5. The GRIN optical connector according to claim 1, wherein the GRIN lens is held in a GRIN lens holder.

6. The GRIN optical connector according to claim 5, wherein the optical fiber bundle is held in an optical fiber holder that is registered and interfaced with the GRIN lens holder.

7. The GRIN optical connector according to claim 6, wherein the optical fiber holder and GRIN lens holder respectively include first and second registration holes, and further include at least one registration pin operably engaged by the first and second registration holes.

8. The GRIN optical connector according to claim 6, further comprising a housing having a front end, back end, and an interior, and wherein the GRIN lens holder and optical fiber holder reside within the interior with the GRIN lens holder adjacent the housing front end.

9. The GRIN optical connector according to claim 6, wherein:
the optical fiber bundle is terminated by an insertion feature of a select shape;
the optical fiber bundle holder has a central hole having a shape complementary to the shape of the insertion feature to provide a keying function.

10. An optical connector assembly, comprising:
the GRIN optical connector according to claim 1 as a first GRIN optical connector; and
a second GRIN optical connector having a complementary configuration to the first GRIN optical connector and operably interfaced with the first GRIN optical connector.

11. An optical fiber connector assembly, comprising:
first and second GRIN lenses, with each GRIN lens having front and back endfaces, an optical axis and a substantially same refractive index profile, wherein the first and second GRIN lenses are interfaced at their front endfaces so that their optical axes are substantially coaxial;
a first optical fiber bundle of a first plurality of optical fibers optically coupled to the back endface of the first GRIN lens and having a first asymmetric configuration relative to the substantially coaxial optical axes;

a second optical fiber bundle of a second plurality of optical fibers optically coupled to the back endface of the second GRIN lens and having a second asymmetric configuration relative to the substantially coaxial optical axes;

wherein the first and second asymmetric configurations are either the same or rotated by 180° and define a plurality of channel pairs of first and second optical fibers; and wherein the channel pairs of first and second optical fibers have a coupling loss that varies among the channel pairs by no more than 0.1 dB.

12. The optical fiber connector assembly according to claim 11, wherein the first optical fibers and second optical fibers consist of multimode optical fibers.

13. The optical fiber connector assembly according to claim 11, wherein the refractive index profile of the first and second GRIN lenses is an alpha profile having an alpha parameter $\alpha$ in the range $1.92 \leq \alpha \leq 1.98$.

14. The optical fiber connector assembly according to claim 13, wherein the GRIN lenses each have a refractive index parameter $\Delta_0$ in the range $1.0 \leq \Delta_0 \leq 3.0$.

15. The optical fiber connector assembly according to claim 11, wherein the first and second GRIN lenses each have a length of about one-quarter pitch.

16. The optical fiber connector assembly according to claim 11, wherein at least one of the first and second GRIN lenses has a length greater than about one-half pitch.

17. A method of performing an optical connection between first and second optical fiber bundles, comprising:

interfacing respective front endfaces of first and second GRIN lenses, each having a back endface, a substantially same refractive index profile based on an alpha profile having an alpha parameter $\alpha$ in the range $1.92 \leq \alpha \leq 1.98$ and optical axes that are made substantially coaxial by said interfacing;

optically coupling a plurality of first optical fibers to the back endface of the first GRIN lens in a first asymmetric arrangement relative to the coaxial optical axes;

optically coupling a plurality of second optical fibers to the back endface of the second GRIN lens in a second asymmetric arrangement relative to the coaxial optical axes, wherein the first and second asymmetric arrangements are the same or are rotated relative to one another by 180°, thereby defining a plurality of channel pairs of first and second optical fibers; and transmitting light between first and second optical fibers within only the respective channel pairs and through the first and second GRIN lenses.

18. The method according to claim 17, wherein the channel pairs have respective amounts of coupling loss that varies as a function of respective offset distances of the channel pairs relative to the coaxial optical axes, and wherein the channel coupling loss varies among the channel pairs by no more than 0.1 dB.

19. The method according to claim 17, wherein optically coupling a plurality of first optical fibers to the endface of the first GRIN lens includes:

holding the first GRIN lens in a GRIN lens holder;

terminating the first plurality of optical fibers by an insertion feature of a select shape;

inserting the insertion feature into a central hole of the optical fiber holder, the central hole having a shape complementary to the shape of the insertion feature to provide a keying function; and interfacing the optical fiber holder in a registered manner with the GRIN lens holder.

* * * * *